United States Patent [19]
Tsuchiya et al.

[11] Patent Number: 5,133,796
[45] Date of Patent: Jul. 28, 1992

[54] AIR-TIGHT SINTERING FURNACE FOR THE PRODUCTION OF A QUARTZ PREFORM

[75] Inventors: Ichiro Tsuchiya; Masahide Saito; Shinji Ishikawa; Toshimi Habasaki, all of Yokohama, Japan

[73] Assignee: Sumitomo Electric Industries, Ltd., Osaka, Japan

[21] Appl. No.: 613,878

[22] PCT Filed: Mar. 28, 1990

[86] PCT No.: PCT/JP90/00418
§ 371 Date: Nov. 28, 1990
§ 102(e) Date: Nov. 28, 1990

[87] PCT Pub. No.: WO90/11973
PCT Pub. Date: Oct. 18, 1990

[30] Foreign Application Priority Data

Mar. 30, 1989 [JP] Japan .................. 64-76706

[51] Int. Cl.$^5$ .................. C03B 37/014
[52] U.S. Cl. .................. 65/144; 65/157; 65/171; 65/172; 65/374.15; 65/1; 65/900
[58] Field of Search .................. 65/3, 12, 13, 18.1, 65/157, 144, 172, 171, 374.15, 374.13, DIG. 16, 900, 1

[56] References Cited

U.S. PATENT DOCUMENTS

| | | | |
|---|---|---|---|
| 4,552,577 | 11/1985 | Varshneya | 65/22 |
| 4,704,257 | 11/1987 | Tomizawa | 156/620.2 |
| 4,741,749 | 5/1988 | Lane | 65/13 |
| 4,969,941 | 11/1990 | Kyoto | 65/157 |

FOREIGN PATENT DOCUMENTS 60-147636 10/1985 Japan .
61-86434 5/1986 Japan .
61-201634 9/1986 Japan .

*Primary Examiner*—Kenneth M. Schor
*Assistant Examiner*—John M. Hoffmann
*Attorney, Agent, or Firm*—Wenderoth, Lind & Ponack

[57] ABSTRACT

This invention relates to a sintering furnace for the production of a quartz preform which can be used for carrying out dehydration, fluorine-addition and/or sintering of a porous quartz soot preform prepared by a flame hydrolysis method such as a VAD method or a OVD method, and in particular, to such a furnace in which joints in a long furnace muffle so long that fabricating it as open body is impossible can be maintained fully gas-tight, so that it is possible to prevent $H_2O$, $O_2$ and other impurities in the air from entering the muffle from outside, and corrosive and poisonous gases in the muffle are prevented from leakage to outside the muffle. This sintering furnace has a muffle of high purity carbon, the inner wall and/or outer wall of which is coated with a gas-impermeable film, which muffle is a cylinder with an axis in the longitudinal direction and divided into a plurality of parts in the longitudinal direction, the parts each having the upper and lower ends finished so as to be flat and abutting adjacent parts sealed by a carbon gasket between them, and further has an air cylinder for pressing the parts together in the axial direction with a uniform force around the circumference of the muffle.

5 Claims, 2 Drawing Sheets

AIR-TIGHT SINTERING FURNACE FOR THE PRODUCTION OF A QUARTZ PREFORM

BACKGROUND OF THE INVENTION

1. Technical Field of the Invention

This invention relates to a sintering furnace for the production of a quartz preform which can be used for carrying out at least one of the steps of dehydration, fluorine-addition and sintering of a porous quartz soot preform prepared by a flame hydrolysis method such as a VAD method or OVD method.

2. Technical Background

As a furnace muffle material of a furnace for the production of a quartz preform such as a quartz preform for optical fibers, for example, there can be used high purity carbon having the inner wall and/or outer wall coated with a gas-impermeable material, shown in FIG. 2, as disclosed in Japanese Patent Laid-Open Publication No. 20163/1986. In FIGS. 2(a) and 2(b), a soot preform 1 is fitted to connection rod 2 which is rotatable and vertically movable in an electric furnace 3 provided with a heater of, e.g., carbon. Numeral 5 designates a furnace muffle of carbon inserted in the surface 3 and made up of parts 15-1 to 15-5. The surface of the tube is coated with SiC and further oxidized. Numeral 6 designates a gas feed port provided at the lower end of the furnace muffle 5 so as to feed a gas such as He, $Cl_2$, $SiF_4$, etc. into the furnace muffle 5 of the SiC-coated carbon. The coating of SiC on the surface of the furnace muffle 5 of carbon is carried out by an ordinary CVD method or plasma CVD method using $SiCl_4$, $SiH_4$, $SiHCl_4$, etc. as a raw material for the Si, and $CH_4$ as a raw material for the C. Generally, the vapor deposition temperature is 1000° C. in the case of the ordinary CVD method and 700°–1000° C. in the case of the plasma CVD method. The coating thickness of SiC is effectively at least 1 μm when using it in an oxidized state. Furthermore, it is known that the furnace muffle of carbon is coated with surface-non-oxidized SiC or gas-impermeable carbon.

However, the above described technique has a problem in that a furnace muffle of SiC-coated high purity carbon, which is commercially available at the present time, has a maximum length of only about 900 mm and when a longer length is required, a plurality of the tubes must be joined. In the structure of the prior art apparatus as shown in FIG. 2(a), however, there is a joint at a relatively high temperature part inside or outside the furnace, except for a relatively small-sized apparatus. FIG. 2(b) is a partial cross-sectional view of such a joint, in which separate upper and lower muffle parts 15-i and 15-i+1 are respectively threaded to each other and the joint sealed by a carbon gasket 16.

However, the gas impermeable property of this structure is not complete, and measurement of the gas permeation from such a furnace muffle with an outer diameter of 210 mm showed 0.36 cc/min/mm·$H_2$). Thus, a small amount of gas permeates through the furnace muffle so that $O_2$ and $H_2O$ outside the furnace muffle enters the furnace muffle and a problem arises that when a preform for optical fibers sintered in such a furnace muffle is finally converted into an optical fiber, the average value of transmission loss of the optical fiber becomes slightly larger than for a fiber prepared in an ordinary quartz muffle.

Since a quartz furnace muffle has a problem with respect to its life, in that in thermal deformation at a high temperature cracking occurs when the temperature is raised once and then lowered to 600° C. or less, resulting in an increase in the cost. On the other hand, it has been necessary to develop a muffle formed of high purity carbon, capable of producing an optical fiber with an average loss substantially similar to a quartz furnace muffle.

The present invention has been made in the light of this situation and aims at providing a sintering furnace for producing a quartz preform, comprising a furnace muffle formed of high purity carbon coated with a gas-impermeable coating, and which is suitable for obtaining an optical fiber with a longer life as well as less loss due to impurities and OH groups.

The present invention has been made as a means for solving the above described problems, being an improvement of a method of sealing a joint of a furnace muffle of high purity carbon coated with a gas-impermeable film.

SUMMARY OF THE INVENTION

The present invention provides a sintering furnace for producing a quartz preform, and in which at least one of the steps of dehydration, fluorine addition and sintering of a quartz preform is carried out, and which comprises a muffle of high purity carbon, the inner wall and/or outer wall of which is coated with a gas-impermeable film, the muffle being of a cylindrical form with an axis extending in the longitudinal direction and divided into a plurality of parts in the longitudinal direction, the parts each having butt parts being sealed by a means for pressing the butt parts in the axial direction, with a carbon gasket between them, by a uniform force on the muffle along the circumference thereof.

DETAILED DESCRIPTION OF THE INVENTION

Figure 1A:
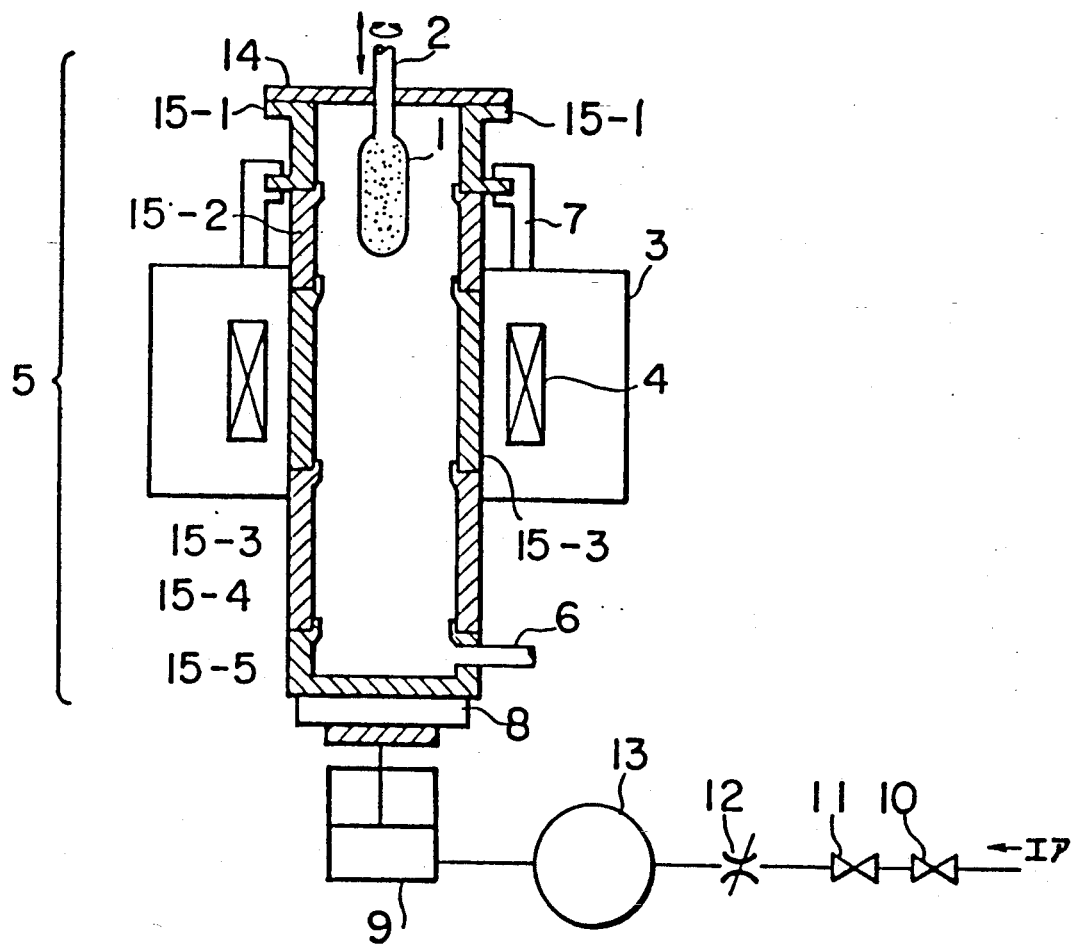
FIGS. 1(a)–1(c) are schematic sectional views to illustrate the sintering furnace for producing a quartz preform according to the present invention, FIG. 1(a) being a schematic view to illustrate an example of the present invention, FIG. 1(b) being a partly enlarged view of the furnace of FIG. 1(a), and FIG. 1(c) being a partly schematic sectional view to illustrate another example of the present invention.

In the present invention, the above-described thrusting means is preferably capable of pressing while maintaining the thrusting force in a constant range even if the muffle is thermally expanded due to a change in temperature. As the thrusting means, there can be used a thrusting means in which one end of the muffle made up of separate abutting parts is fixed and the other end thereof is pressed toward the one end by an air cylinder having a stroke capable of responding to the whole range of change of length due to thermal expansion of the muffle, the air cylinder provided having a sufficient volume to respond to a change of the inner volume of the cylinder due to a change of the position of the air cylinder, and a thrusting means in which one end of the divided muffle is fixed and the other end thereof is pressed toward the one end by a spring designed with a thrusting force and a stroke capable of responding to the whole range of change of length due to thermal expansion of the muffle and during the same time the thrusting force is in a predetermined range.

Preferably, the sintering furnace of the present invention is a hollow zone furnace in which the above described muffle extends through the hollow zone and outside which the thrusting means is provided, or a soaking furnace that can keep a soot preform in a uniformly heated space, in which at least one of the above described muffles extends through a heating zone or furnace body and which has the above described thrusting means where the muffle extends through the soaking furnace or at a lower temperature part of the soaking furnace.

The inventors have made various studies to achieve the above described object and consequently have found that the reason why complete sealing cannot be obtained by the threaded joint system of the prior art is that (1) the degree of parallelism of the butt surfaces against a gasket is not sufficient and the gasket is not uniformly engaged, and (2) a sufficient sealing force cannot be applied to the gasket.

As a result of further studies based on the above described knowledge, it has been found that a leakage of gas can be completely prevented by finishing the upper and lower ends of the parts of the muffle so they are flat and uniformly clamping the whole circumference around the gasket. However, this method cannot be used when the separate parts are at a temperature of 500° C. or higher, since copper, SUS or aluminum alloys, commonly used, cannot be used. Thus, in the present invention, one end of the muffle of separate abutting parts at a temperature lower than 500° C. is fixed and the other end thereof at a temperature of 500° C. or lower is pressed toward the one end in the axial direction of the muffle in such a manner that the force is uniformly applied to the circumference thereof. This mechanism is the feature of the invention. Furthermore, the other feature of the invention is that the thrusting force can be maintained in a constant range even if the muffle is subjected to thermal expansion due to a change in temperature. Such a mechanism can be achieved, for example, by providing an air cylinder or spring, and will now be illustrated by a preferred embodiment as shown in the accompanying drawings.

Figure 1B:
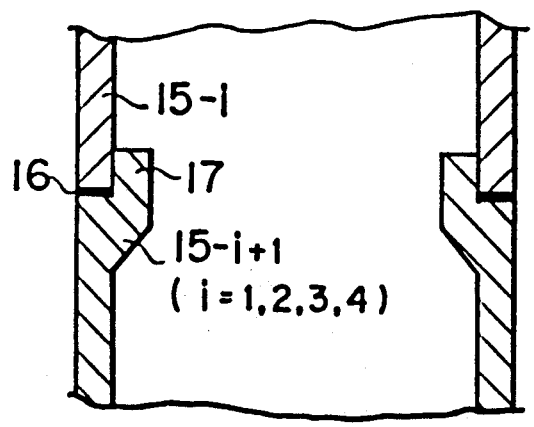
Figure 1C:
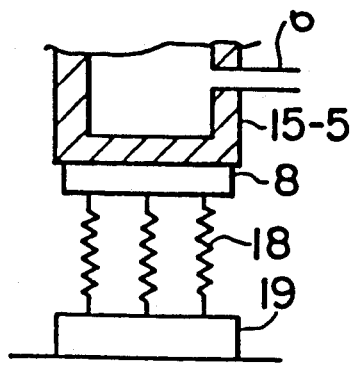

Referring to FIGS. 1(a)-1(c), the sintering furnace for producing a quartz preform comprises a porous glass soot preform 1, a connection rod 2, an electric furnace 3, a heater 4, a muffle 5, a gas feed port 6, a support 7, a plate 8, an air cylinder 9, a regulator 10, a valve 11, a speed controller 12, an air reservoir 13, an upper lid 14 of the muffle, cylindrical parts 15-1, 15-2, 15-3, 15-4 and 15-5 of the muffle for forming the cylindrical muffle, a carbon gasket 16, a positioning structure 17, a spring 18 and a plate 19.

FIG. 1(a) shows the complete embodiment of the sintering furnace for producing a quartz preform, in which the soot preform 1 is fitted on the connection rod. The electric furnace is provided with the heater 4 therein. The muffle 5 of carbon is inserted in the furnace 3 and consists of the upper lid 14 and cylindrical parts 15-1 to 15-5, the surfaces of which are coated with SiC. The cylindrical muffle is divided into five parts of 15-1, 15-2, 15-3, 15-4 and 15-5 numbered from above. The gas feed inlet 6 is for feeding gas to the above described furnace muffle 5. The cylindrical part 15-1 of the muffle is fixed at a flange part by a support 7 and the part 15-5 is pressed through the plate 8 by air cylinder 9. The plate 8 and the air cylinders 9 are contacted so that the thrusting force on the cylindrical muffle 5, in the axial direction, is uniform over the circumference thereof. The air cylinder 9 is provided with air pressure through the regulator 10, the valve 11, speed controller 12 and air reservoir 13.

FIG. 1(b) is a partly enlarged view of a joint part of the muffle shown in FIG. 1(a), in which the lower end of part 15-i and the upper end of part 15-i+1 (i = 1 to 4) are finished so as to be flat and hold the carbon gasket 16 between them, the carbon gasket 16 being fixed by the positioning structure 17 on the part 15-i+1. The upwardly projecting positioning structure 17 on the lower part engages the inside surface of the upper part.

FIG. 1(c) shows an alternative means for pressing which can be used in place of the air cylinder 9, in which the plate 8 and plate 19 are urged away from each other by a plurality of springs 18, the spring being arranged on plate 19 so that the thrusting force on the circumference of muffle 5 is uniform.

It has been found by experiments that the thrusting force on the joints to obtain sufficient sealing should be at least 200 kgf for a muffle having an outer diameter of 210 mm and a thickness of 8 mm. However, this value, depending upon the kind and area of the gasket, the finishing precision of the butt surface and the allowable amount of leakage, cannot be determined unconditionally. On the other hand, the upper limit of the thrusting force depends on the strength of the structure of the muffle and the carbon material. In the apparatus of FIG. 1(a), this value is determined by the bending stress on the fixed flange part 15-1 and the designing is carried out considering the safety factor, so that a thrusting force of at most 500 kgf is applied. When the furnace body 3 has an overall length of 800 mm in the longitudinal direction, the thermal expansion of the muffle 5 heated from room temperature to 1700° C. is about 10 mm, and this thermal expansion can be absorbed if there is a stroke of at least 15 mm. If the thrusting means is not provided with the means for absorbing the thermal expansion, thermal stress greatly exceeding the upper limit of the thrusting force is applied to the muffle and the muffle or the thrusting means will be broken.

In order to satisfy the above described conditions, an air cylinder 9 of 100 mm in diameter is used in the apparatus of FIG. 1(a) and an air pressure of 5 kgf/cm$^2$ at normal temperature is applied to the cylinder. The air reservoir 13 has an inner volume of 1000 ml and is arranged to be sufficiently far from the furnace 3 so that when the furnace 3 is heated, no temperature change takes place in the air reservoir 13. Since during this time the thrusting force on the cylinder 9 is about 390 kgf and the amount of air displaced by a stroke of 15 mm is about 120 cc, the change of the thrusting force due to displacement of the cylinder 9 is at most 10% and in practice, the stroke is about 10 mm and the volume of air is only at most 10% larger than the volume of the air reservoir.

In the structure as shown in FIG. 1(c), five springs having a spring constant of 20 kgf/cm$^2$ and a load length of 6 cm are used and fitted in such a manner that the whole pressing means will contract at normal temperature by 3 cm from the free length and the spring pressing force is 300 kgf. In this case, the pressing force increases to 450 kgf when the muffle expands 15 mm.

The present invention will now be illustrated in detail by the following examples.

EXAMPLE 1

Using the apparatus of FIG. 1(a), a blank lid was tightly fastened to the muffle 5 in place of the upper lid 14 for holding a preform, the blank lid and muffle were sealed by an O-ring, and $N_2$ gas was introduced thereinto until the inner pressure in the muffle was 300 $mmH_2O$. The furnace 3 was maintained at normal temperature. After allowing the system to stand for 20 minutes, it was found that the pressure within the muffle was unchanged.

EXAMPLE 2

Using the apparatus of FIG. 1(c), the procedure of Example 1 was repeated, and no change in the external pressure was found even after allowing the system to stand for 20 minutes.

COMPARATIVE EXAMPLE 1

Using an apparatus with screw-threaded joints as used in the prior art, the procedure of Example 1 was repeated. The initial internal pressure of 300 $mmH_2O$ fell to about 30 $mmH_2O$ after allowing the muffle to stand for 10 minutes. This pressure difference was considered to be due to leakage through the joints.

EXAMPLE 3

Using the apparatus of FIG. 1(a), the muffle was heated to 1650° C. with an atmosphere of He and SiF therein. As the coating of the muffle there was used a gas-impermeable film of pyrolytic carbon. When litmus paper was applied to the outside of the joint part of the muffle to see whether discoloration took place or not, no color change was found. As to the gas in the furnace, the presence of HF gas was detected by means of an HF detecting tube at 200° C. and 1600° C. In both cases, the amount of HF gas was found to be less than the detection limit, which showed that there was no leakage of gas.

COMPARATIVE EXAMPLE 2

Figure 2A:
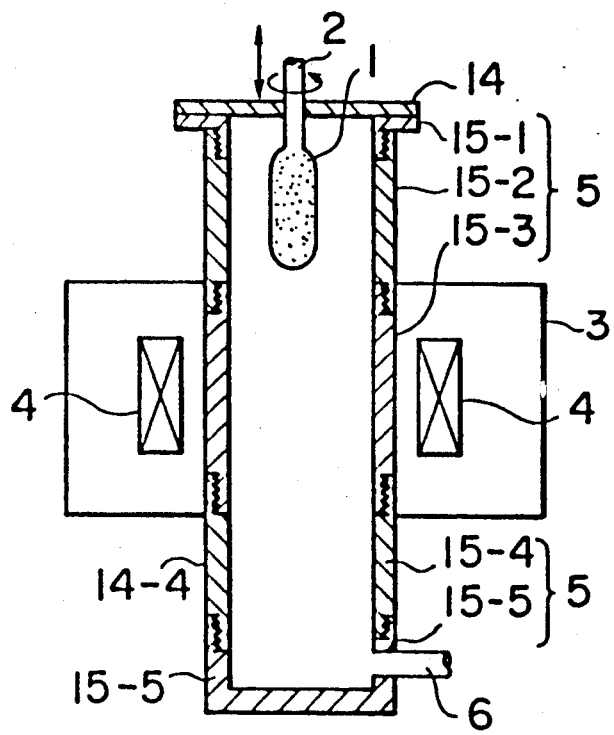
FIGS. 2(a) and 2(b) are schematic sectional views illustrating the structure of the prior art, FIG. 2(b) being a partly enlarged view of FIG. 2(a).
Figure 2B:
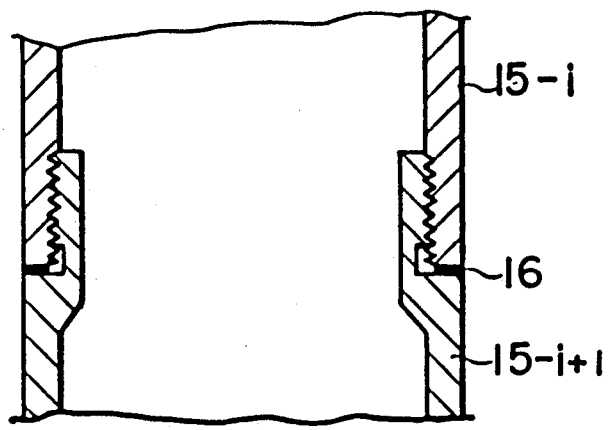

Using the apparatus of FIG. 2, the atmosphere in the muffle and the heating temperature were maintained similar to those of Example 3. When a litmus paper was brought close to the outside of a joint part of the muffle, it turned yellow soon after the start of flowing $SiF_4$. When the concentration of HF in the muffle was measured by a HF detecting tube at 1200° C., HF with a concentration of at least 10 ppm was found, exceeding the measurement limit of the HF detecting tube. These results showed that in the structure as shown in FIG. 2, there was gas leakage from the muffle.

UTILITY AND POSSIBLE USE ON COMMERCIAL SCALE

As shown from the above, when using the sintering furnace according to the invention for the production of a quartz preform, a muffle so long that formation of it as a single body is impossible can be maintained completely gas tight and it is possible to prevent $H_2O$, $O_2$ and other impurities in the air from entering the muffle from outside the muffle and corrosive and poisonous gases in the muffle from leaking outside the muffle. When using gas-impermeable carbon for the muffle, there is no need to take into account thermal deformation and cracking when the temperature is lowered as is encountered in the ordinary quartz muffle. Furthermore, another advantage can be obtained, namely that it can be expected to produce an optical fiber with an average value of loss similar to that obtained when using a quartz muffle, because of the complete gas-tightness.

We claim:

1. A sintering furnace for producing a quartz preform and in which at least one of the steps of dehydration, fluorine addition and sintering of the quartz preform can be carried out, said furnace comprising:

a muffle of high purity carbon and having an inner wall and/or outer wall coated with a film impermeable to gases used in the dehydration, fluorine addition, or sintering treatment of the preform in the muffle, said muffle having a cylindrical shape with an axis in the longitudinal direction and being divided into first and second opposite end parts and a plurality of intermediate parts abutting each other in the longitudinal direction, the end parts each having a butt surface opposed to its adjacent intermediate part and the intermediate parts each having butt surfaces on both opposite ends of each, all of said butt surfaces being finished flat and abutted with corresponding butt surfaces on adjacent parts and a carbon gasket between each pair of abutting surfaces for sealing the parts together;

means on said furnace engaged with the first end part for preventing movement of said first end part away from the other parts of said muffle; and pressure applying means at the second end part of said muffle for applying pressure to the second end of said muffle toward said first end and constituted by an air cylinder having a piston member and a cylinder member movable relative to each other, one of said piston and cylinder members engaged with the second end part of said muffle for applying pressure to said muffle uniformly around the circumference of said muffle, said air cylinder having a stroke at least as great as the expansion of said muffle due to heating of the muffle from ambient temperature up to a temperature sufficient for carrying out one of said steps for permitting said muffle to expand and move one of said piston and cylinder members of said air cylinder relative to the other to change the volume within said air cylinder, and air supply conduit means connected to said air cylinder and including an air reservoir having a volume larger than the change in volume within said air cylinder during expansion of said muffle.

2. A sintering furnace as claimed in claim 1 in which said furnace is a hollow zone furnace having a hollow part through which said muffle extends, and said means for applying pressure is outside said hollow zone furnace.

3. A sintering furnace as claimed in claim 1 or 2 in which said furnace is a soaking furnace having a furnace body with a heating part, and in which at least one end of said muffle extends through said heating part.

4. A sintering furnace as claimed in claim 3 in which said means for applying pressure is positioned at the portion of said muffle which extends through said soaking furnace.

5. A sintering furnace as claimed in claim 3 in which said soaking furnace has a lower temperature portion and said means for applying pressure is in said lower temperature portion.

* * * * *